United States Patent [19]

Rider

[11] 4,193,422

[45] Mar. 18, 1980

[54] ANNULAR FLOW DIVERTER VALVE

[75] Inventor: Robert L. Rider, Walkersville, Md.

[73] Assignee: The United States of America as represented by the United States Department of Energy, Washington, D.C.

[21] Appl. No.: 963,654

[22] Filed: Nov. 24, 1978

[51] Int. Cl.² .............................................. F16K 11/02
[52] U.S. Cl. .................................. 137/625.49; 137/862
[58] Field of Search ............ 137/862, 872, 874, 625.49

[56] References Cited

U.S. PATENT DOCUMENTS

| 3,236,253 | 2/1966 | Symmons | 137/119 |
| 3,700,005 | 10/1972 | Fletcher et al. | 137/862 |
| 3,771,562 | 11/1973 | Curran | 137/625.4 |

Primary Examiner—Arnold Rosenthal
Attorney, Agent, or Firm—R. V. Lupo; Frank H. Jackson

[57] ABSTRACT

A valve for diverting flow from the center of two concentric tubes to the annulus between the tubes or, operating in the reverse direction, for mixing fluids from concentric tubes into a common tube and for controlling the volume ratio of said flow consists of a toroidal baffle disposed in sliding engagement with the interior of the inner tube downstream of a plurality of ports in the inner tube, a plurality of gates in sliding engagement with the interior of the inner tube attached to the baffle for movement therewith, a servomotor having a bullet-shaped plug on the downstream end thereof, and drive rods connecting the servomotor to the toroidal baffle, the servomotor thereby being adapted to move the baffle into mating engagement with the bullet-shaped plug and simultaneously move the gates away from the ports in the inner tube and to move the baffle away from the bullet-shaped plug and simultaneously move the gates to cover the ports in the inner tube.

4 Claims, 4 Drawing Figures

ANNULAR FLOW DIVERTER VALVE

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to valves useful both for flow divergence and flow convergence and more particularly to servo-controlled annular flow diverter valves which are also useful in the reverse direction for flow mixing. In more detail, the invention relates to a valve capable of splitting a single inflowing stream into two separate and distinct outflowing streams wherein one of the outflowing streams follows the original flow path and the other outflowing stream follows a flow path immediately surrounding the first flow path. The valve operating on fluid flow in the reverse direction can also act as a controllable device capable of mixing two fluids flowing from a concentric system into the inner tube. Specifically, the invention relates to a valve for diverting flow from the center of two concentric tubes to the annulus between the tubes and for controlling the volume ratio of said flows.

Flow divergence, or splitting, describes a configuration wherein a valve is utilized to split a single inflowing stream of fluid into two separate and distinct outflowing streams. A control valve of this type is one capable of varying the ratio of the mass flows of the two outflowing streams.

Flow mixing in a controlled manner describes a configuration wherein a valve is utilized to combine two separate and distinct inflowing streams. The ratio of the mass flows of the inflowing streams is capable of being varied.

Particularly where a minimum amount of space is available and zero leakage is a requirement, mechanical seals and complex pressure boundary configurations are avoided for process systems where it may be desirable to split an incoming stream of fluid into two outflowing streams, one of which continues along the flow path of the inflowing stream and the other of which follows a flow path immediately surrounding the first outflowing stream and to control the volume ratio of fluids in the two outflowing streams. Such a configuration may be desirable, for example, when it is necessary to bypass flow away from the original flow path on a controlled basis. As a mixer the valve is useful in annular systems where otherwise the flow streams would have to be directed into parallel piping which run into a separate mixing device.

A valve of this kind is specifically useful in controlling the flow of helium used as a coolant to vary the amount of cooling obtained. The valve also is useful in liquid (including liquid metals), two-phase, slurrying and fluidized particulate systems where the fluid may be at high pressure and/or may be corrosive.

DESCRIPTION OF THE PREFERRED EMBODIMENT

Figure 1:
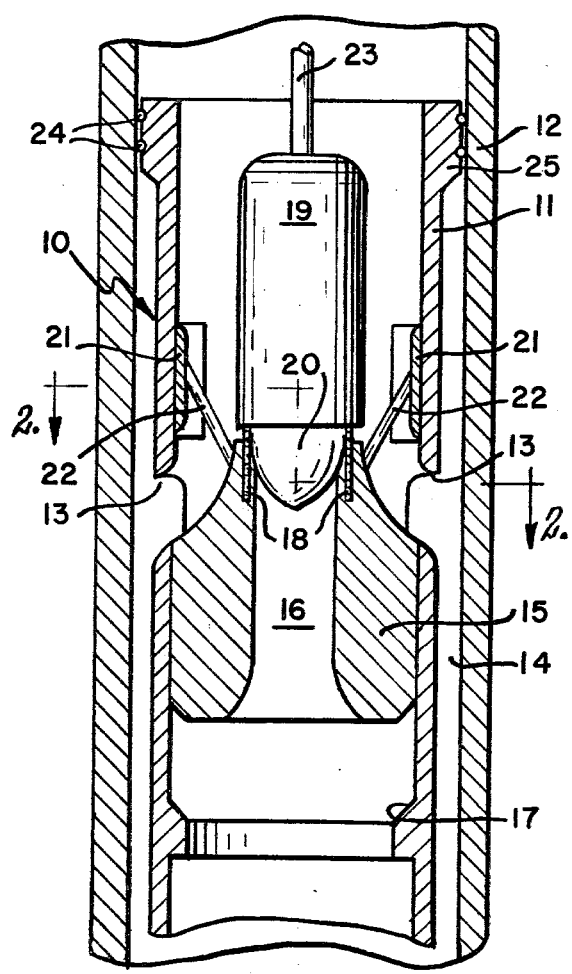
FIG. 1 is a vertical cross-section partly in elevation of an annular flow diverter valve according to the present invention wherein the valve is in bypass position.

According to the present invention, a diverter valve 10 is disposed in the inner of two concentric tubes 11 and 12 to divert flow normally flowing through inner tube 11 through ports 13 in inner tube 11 to annulus 14 between inner tube 11 and outer tube 12. Typically, four equispaced ports 13 may be employed as shown. Valve 10 includes a toroidal baffle 15 consisting of a circular cylinder having an axial opening 16 therein, the cylinder being of substantially greater length at its interior periphery than at its outer periphery. The bottom or downstream end of the baffle 15 is generally perpendicular to the axis of the baffle, the upper or upstream end therefor tapering inwardly to a narrow top. This tapered surface is concave and merges smoothly with ports 13 to provide a nonturbulent flow path for fluid diverted to annulus 14.

Baffle 15 is disposed downstream of ports 13 in sliding engagement with the interior surface of inner tube 11. The bottom of the baffle is chamfered at its inner and outer edges, the chamfer on the outer edge mating with a ledge 17 on the interior of inner tube 11 which constitutes a valve stop at the lower end of travel of the diverter valve. The total height of baffle 15 is slightly greater than its diameter.

Baffle 15 is moveable upwardly and downwardly by drive rods 18 which enter baffle 15 through the narrow top thereof by means of a servomotor 19. Servomotor 19 has a bullet-shaped plug 20 on the downstream end thereof adapted to mate with axial opening 16 in baffle 15 to seal the opening.

Figure 3:
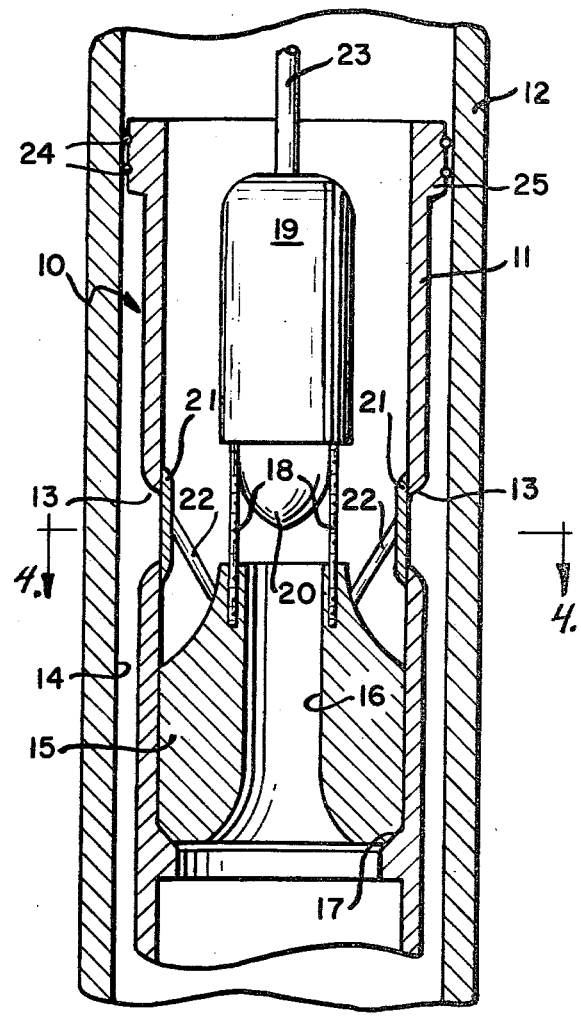
FIG. 3 is a vertical cross-section partly in elevation of the valve in normal flow position.
Figure 2:
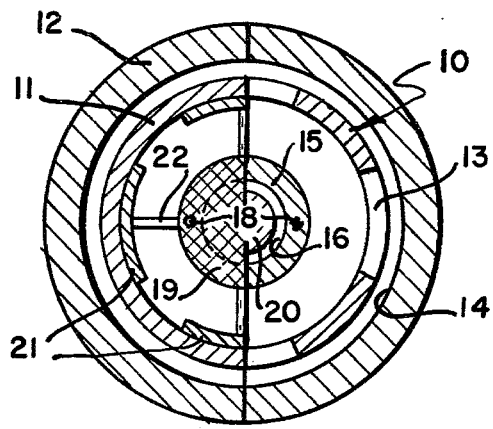
FIG. 2 is a horizontal cross-section taken in the direction of the arrows 2—2 in FIG. 1.
Figure 4:
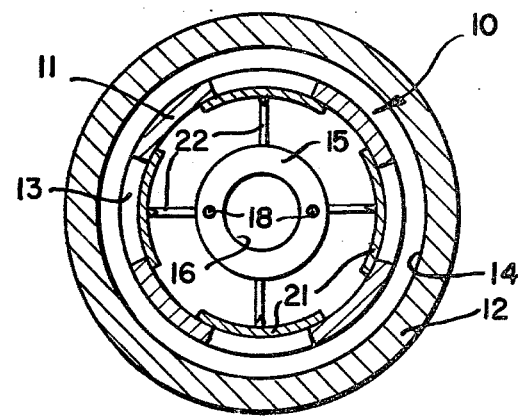
FIG. 4 is a horizontal cross-section taken in the direction of the arrows 4—4 in FIG. 3.

Slidable gates 21 are attached to baffle 15 by gate supports 22 to move therewith. Gates 21 are in sliding engagement with the interior surface of inner tube 11 and are so located with respect to the baffle that when the baffle is down in the open or normal flow position gates 21 are disposed across ports 13 as shown in FIG. 3 to prevent fluid from flowing therethrough and when the baffle is up in mating engagement with plug 20 in the bypass flow position as shown in FIG. 1, gates 21 no longer cover ports 13 so that fluid flow can pass therethrough. In intermediate positions flow in both flow paths is permitted. Servomotor 19 is supported by support arm 23 and flow through annulus 14 upstream of opening 13 is prevented by O-rings 24 set in a narrowed annulus between outer tube 12 and a collar 25 on inner tube 11. Required instrumentation and positioning leads are not shown.

Alternates to the specific embodiment of the invention shown include replacing the four slidable gates 21 with a ring and eliminating the gates completely by lengthening the toroidal baffle and drilling holes therein so that it can also serve as a gate for the ports 13. In lieu of the support arm 23, the servomotor 19 can be mounted as an integral part of or attached to, the inner tube 11.

The valve as shown is designed to be installed from either end of the outer tube. It can be either an integral part of the inner tube assembly or can be fastened thereto by a threaded joint.

Operation of the diverter valve will be immediately apparent from the above description. Actuation of the servomotor 19 to draw the toroidal baffle 15 up into mating engagement with plug 20 to close the axial opening 16 therein simultaneously withdraws slidable gates 21 from a position covering ports 13 whereby flow is bypassed through annulus 14. Actuation of the servomotor 19 to remove the plug 20 from opening 16 in toroidal baffle 15 simultaneously causes gates 21 to slide across ports 13 whereby flow continues through inner tube 11. Control of the mass flows of the outflowing streams is easily attained by setting the toroidal baffle 15 in an intermediate position. Operation of the valve in the reverse direction as a flow convergence valve is also readily apparent and no further discussion thereof is needed.

One specific utility of importance for this valve is to control the flow of helium available as coolant. Helium flowing through inner tube 11 may, for example, be used as a coolant under circumstances wherein it is desirable to vary the temperature of the material being cooled. This is accomplished with this valve by diverting any flow not needed for cooling through annulus 14. For this purpose, it is only necessary that the valve control flow within the 90-10% range and the valve need not be so constructed that all flow can be cut off through axial opening 16 or through annulus 14. It would not, however, be difficult to design the valve to include on-off positions.

Advantages of this valve are as follows:

1. Valve is entirely within the process systems. Thus, mechanical seals are eliminated and the only penetrations into the process system are electrical leads. Thus, near zero leakage can be obtained.

2. No bulky external valve actuator is necessary. Thus, required space is minimized.

3. Due to the shape of the ports 13, baffle 15, opening 16, servomotor 19, plug 20, and gates 21, operation of the valve provides a very smooth range of flow control with little turbulence and pressure drop. The shape of these elements can be varied depending on system requirements.

4. Since the valve is independent of the outer tube, conventional design provisions normally made to accomodate the annular system to thermal expansion of the inner tube will inherently accomodate the valve.

5. All wetted surfaces are metal and can be made easily of corrosion-resistant alloys.

6. All portions of the valve can easily be designed to withstand severe system normal and transient conditions, since the valve parts are not part of the pressure boundary and not subject to high stresses.

The embodiments of the invention in which an exclusive property or privilege is claimed are defined as follows:

1. A valve for splitting a stream of fluid in a tube having a plurality of ports therein into two streams, one of which continues through the tube and the other of which continues outside the tube and for controlling the volume ratio of the outflowing streams comprising:

a toroidal baffle disposed in sliding engagement with the interior of said tube downstream of said ports, means for closing said ports operable with and attached to said baffle, a servomotor having a bullet-shaped plug thereon disposed in the tube with the plug facing the toroidal baffle, and drive rods connecting the servomotor to the toroidal baffle, the servomotor being adapted to move the baffle into mating engagement with the bullet-shaped plug and simultaneously move the gates away from the ports in the tube and to move the baffle away from the bullet-shaped plug and simultaneously move the gates across the ports in the tube.

2. Valve according to claim 1 wherein the means for closing said ports comprise gates attached to the toroidal baffle and disposed in sliding engagement with the interior surface of the tube.

3. Valve according to claim 2 and including a ledge on the interior of the tube which constitutes a valve stop at the lower end of travel of the diverter valve.

4. Valve according to claim 3 wherein the valve is disposed in the inner of two concentric tubes and including an O-ring in the annulus between the concentric tubes upstream of the ports whereby the flow continuing outside the inner tube flows through the annulus between tubes.

* * * * *